US008453308B2

(12) United States Patent
Helmers

(10) Patent No.: US 8,453,308 B2
(45) Date of Patent: Jun. 4, 2013

(54) TRUNNION PAINTING FIXTURE

(75) Inventor: Robert Helmers, North Conway, NH (US)

(73) Assignee: R-Coating, Inc., North Conway, NH (US)

( * ) Notice: Subject to any disclaimer, the term of this patent is extended or adjusted under 35 U.S.C. 154(b) by 0 days.

(21) Appl. No.: 13/546,156

(22) Filed: Jul. 11, 2012

(65) Prior Publication Data

US 2012/0276298 A1 Nov. 1, 2012

Related U.S. Application Data

(62) Division of application No. 12/249,411, filed on Oct. 10, 2008, now Pat. No. 8,240,019.

(51) Int. Cl.
*B23Q 3/00* (2006.01)

(52) U.S. Cl.
USPC .......................................... 29/281.1; 29/281.5

(58) Field of Classification Search
USPC ... 29/281.1, 270, 244, 281.5, 281.6; 427/142, 427/327, 8, 427.3; 269/17, 37; 118/505, 681
See application file for complete search history.

(56) References Cited

U.S. PATENT DOCUMENTS 3,583,105 A 6/1971 Popp
3,776,990 A * 12/1973 Watkins, Jr. et al. ............ 264/54
3,787,039 A 1/1974 Zeichman
3,843,000 A 10/1974 Bennett
4,244,416 A 1/1981 Newton
4,426,747 A 1/1984 Mola et al.
4,460,306 A 7/1984 Hawkins
4,527,300 A 7/1985 Kunde et al.
4,532,665 A 8/1985 Evans et al.
4,950,505 A 8/1990 Fogal
5,161,281 A 11/1992 Hanen
5,364,656 A * 11/1994 Koorey .......................... 427/142
5,513,938 A 5/1996 Chambers
5,653,247 A 8/1997 Murakami
5,673,843 A 10/1997 Gainey
5,725,205 A * 3/1998 O'Berg ........................... 269/37
5,934,626 A 8/1999 Collins
6,860,800 B1 3/2005 Maurer
7,234,186 B2 6/2007 Peters
7,448,606 B1 * 11/2008 Johnson .......................... 269/17
8,276,895 B2 * 10/2012 Brown et al. ................... 269/45
8,328,173 B1 * 12/2012 DesForge et al. ............... 269/71
2010/0090386 A1 4/2010 Helmers
2012/0276298 A1 * 11/2012 Helmers ....................... 427/468

* cited by examiner

*Primary Examiner* — Lee D Wilson
(74) *Attorney, Agent, or Firm* — RatnerPrestia

(57) ABSTRACT

A painting tool for painting a vehicle wheel is disclosed. The tool includes a base and a plurality of idler wheels rotatably coupled to the base. The wheels are disposed about the base to rotatably support a workpiece. A motor is coupled to the base and includes a motor output disposed to engage the workpiece and to rotate the workpiece on the plurality of idler wheels about a workpiece axis. A mask is operatively coupled to the base. The mask is movable between an engaged position wherein the mask obscures a portion of the workpiece and a disengaged position wherein the mask is disposed away from the workpiece. A method of painting a vehicle wheel is also disclosed.

14 Claims, 4 Drawing Sheets

TRUNNION PAINTING FIXTURE

This application is a divisional of U.S. patent application Ser. No. 12/249,411, filed on Oct. 10, 2008, which is incorporated herein by reference.

BACKGROUND OF THE INVENTION

Military vehicle tire rims are painted to extend the life of the rims in the harsh environments in which the rims are typically subjected or to impart special properties as specified by the military, such as infrared camouflage or chemical agent resistance. In order to properly paint the rims, the military has developed specifications that specify what portions of the rims are to be painted, and what portions are not to be painted. A contact area between tire rim and the tire bead which is to be mounted onto the tire rim is known as a bead contact area. The military specifications require that the paint applied to the tire rim not intrude on the bead contact area. This requirement assures sealing of pressurized air within the tire when the tire is mounted on the tire rim. Further, it is desired not to paint the portion of the tire rim that is to be obscured by the tire, because such painting wastes paint.

Conventional painting or powder coating tire rims requires masking surfaces over which it is desired not to paint. The step of applying masking material to the tire rim is time consuming, inaccurate, and costly. Further, the masking material must be disposed of after only a single use. Alternatively, reusable masking material is expensive, easily misapplied, and inflexible from one wheel design to the next. There exists a need to accurately, quickly, and inexpensively mask a tire rim for painting without generating disposable material.

SUMMARY OF THE INVENTION

Briefly, the present invention provides a painting tool comprising a base and a plurality of idler wheels rotatably coupled to the base. The wheels are disposed about the base to rotatably support a workpiece. A motor is coupled to the base and includes a motor output disposed to engage the workpiece and to rotate the workpiece on the plurality of idler wheels about a workpiece axis. A mask is operatively coupled to the base and is movable between an engaged position wherein the mask obscures a portion of the workpiece and a disengaged position wherein the mask is disposed away from the workpiece.

The present invention also provides, in addition to the painting tool disclosed above, the base being a modular base comprising a plurality of longitudinal base members, a plurality of transverse base members releasably coupled to the plurality of elongated longitudinal base members, and a plurality of coupling elements releasably coupling the plurality of longitudinal base members to the plurality of transverse base members. The plurality of idler wheels are rotatably coupled to at least one of the transverse base members. The mask is operatively coupled to at least another of the plurality of transverse base members.

Also, a method of painting a portion of a wheel is also disclosed. The method comprises the steps of mounting the wheel on a painting tool; pivoting a mask from a disengaged position away from the wheel to an engaged position engaging the wheel such that the mask obscures a portion of the wheel; rotating the wheel on the painting tool; and applying paint to the wheel proximate to the mask such that the paint is not applied to the obscured portion of the wheel.

BRIEF DESCRIPTION OF THE DRAWINGS

The foregoing summary, as well as the following detailed description of an exemplary embodiment of the invention, will be better understood when read in conjunction with the appended drawings, which are incorporated herein and constitute part of this specification. For the purposes of illustrating the invention, there are shown in the drawings an exemplary embodiment of the invention. It should be understood, however, that the invention is not limited to the precise arrangements and instrumentalities shown. In the drawings, which are not necessarily drawn to scale, the same reference numerals are employed for designating the same elements throughout the several figures. In the drawings.

DETAILED DESCRIPTION OF THE INVENTION

Figure 1:
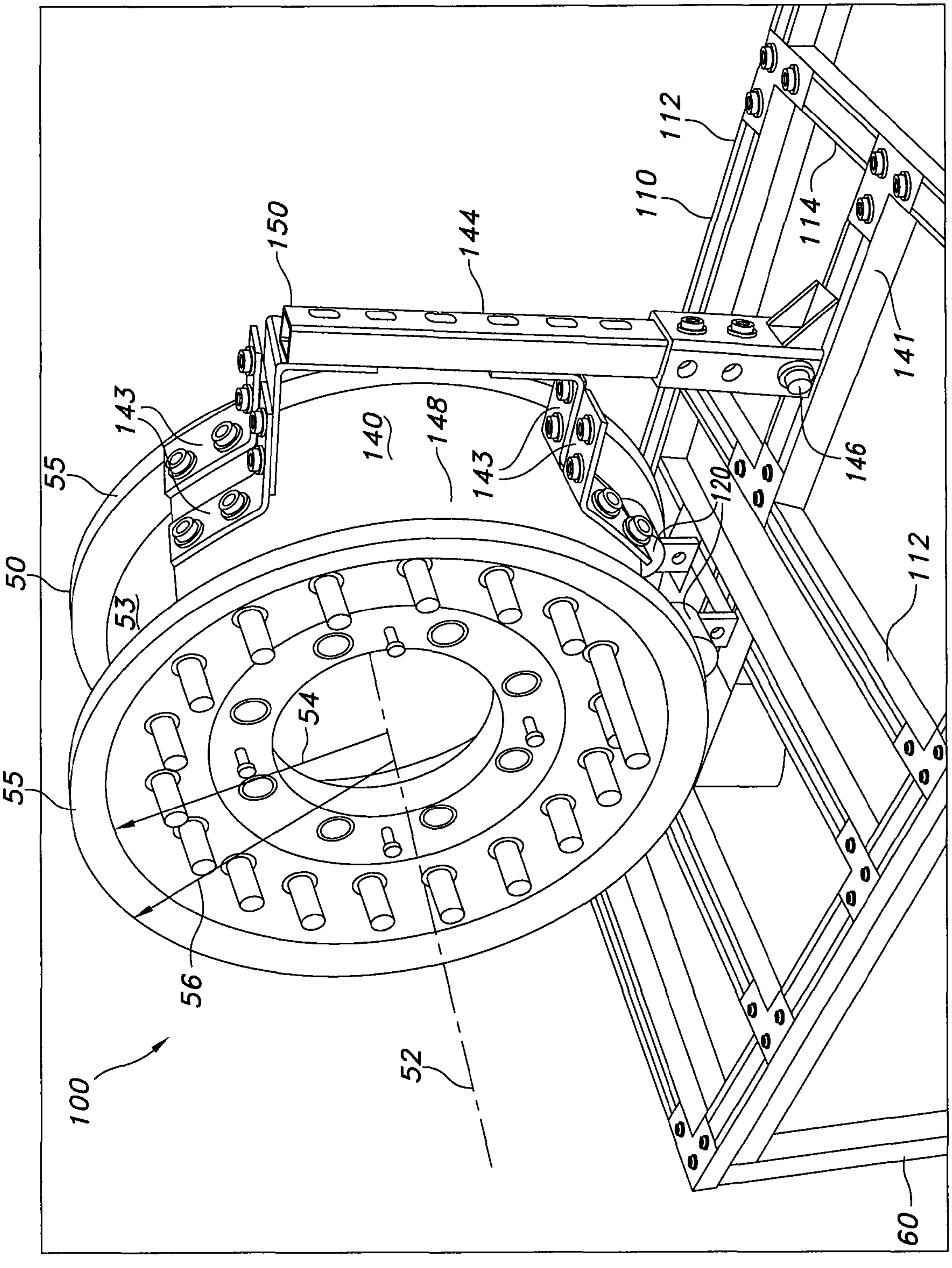
FIG. 1 is a perspective view of a painting tool according to an exemplary embodiment of the present invention, with a masking arm in an engaged position on a workpiece.

Certain terminology is used herein for convenience only and is not to be taken as a limitation on the present invention. The terminology includes the words specifically mentioned, derivatives thereof and words of similar import. Exemplary features of an embodiment of this invention will now be described with reference to the figures. It will be appreciated that the spirit and scope of the invention is not limited to the embodiment selected for illustration. It is contemplated that any of the configurations and materials described hereafter can be modified within the scope of this invention.

Referring to the figures in general, a painting tool 100 according to an exemplary embodiment of the present invention is shown. Painting tool 100 may be used to coat or paint a tubular or cylindrical workpiece such as, for example, a wheel 50, as wheel 50 is rotated about its axis 52 by painting tool 100. A mask 140 on painting tool 100 obscures a portion of wheel 50 that is not to be coated or painted. An exemplary wheel 50 may be a vehicle tire rim, which has a cylindrical wheel body 53 having a wheel radius 54 and outer rims 55 on either side of wheel body 53, with outer rims 55 having an outer rim radius 56.

While the present invention is described below as a painting tool, those skilled in the art will recognize that the present invention may be used for powder coating or other process that requires deposition of a material onto a workpiece.

Figure 2:
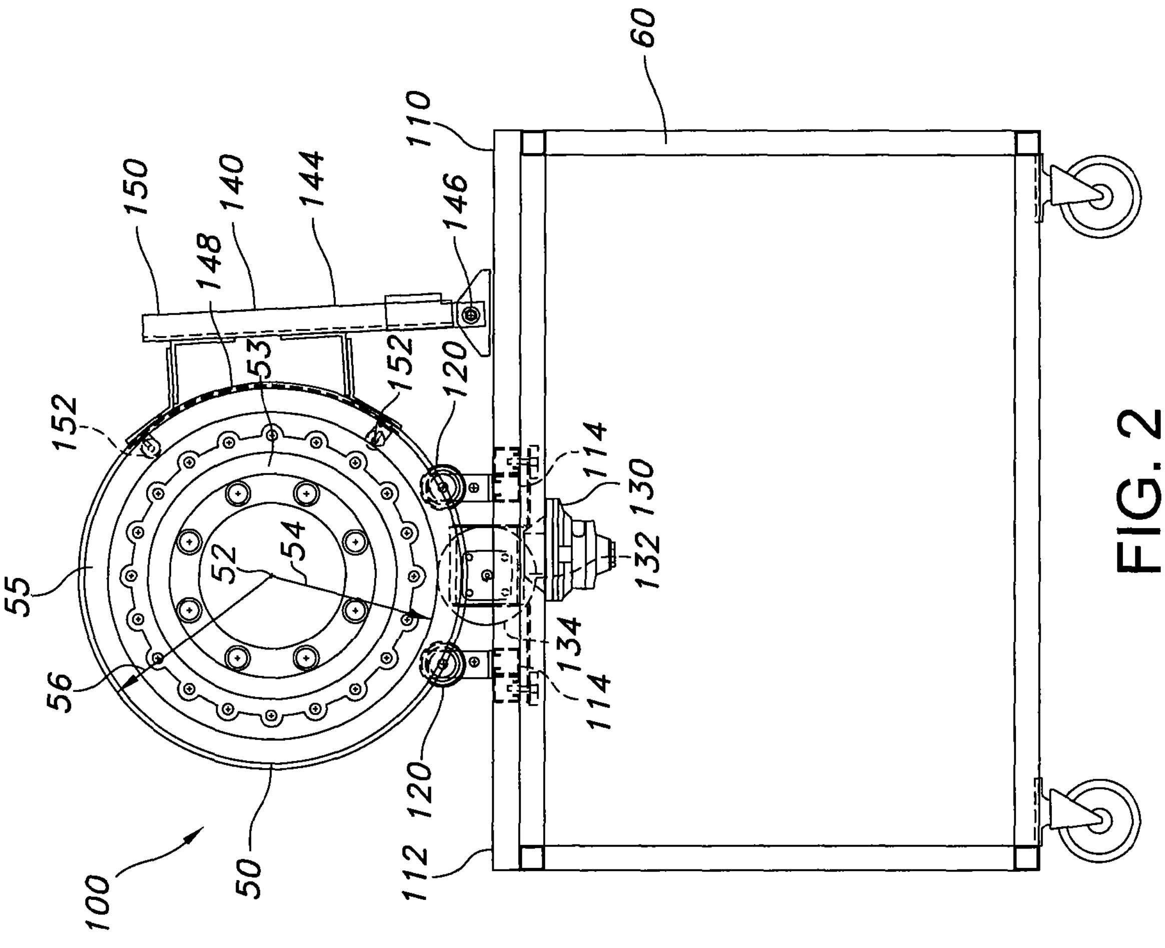
FIG. 2 is a side elevational view of the of FIG. 1.
Figure 3:
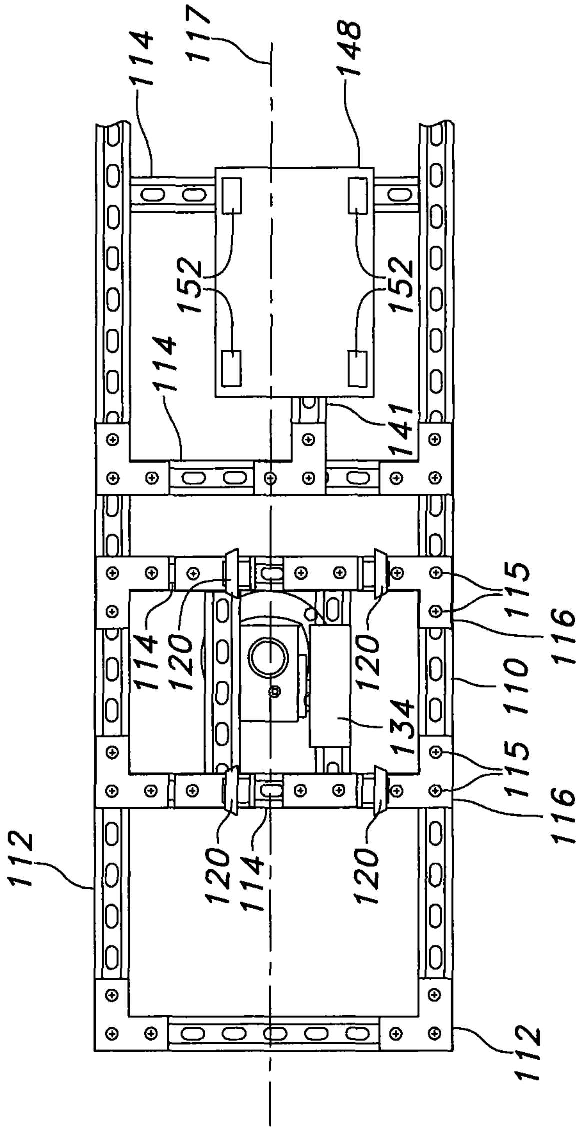
FIG. 3 is a top plan view of the painting tool of FIG. 1, with the workpiece removed.

Referring now specifically to FIGS. 1-3, painting tool 100 includes a base 110 that supports wheel 50 and rotates wheel 50 about its axis 52. Base 110 may be portable, and may be mounted on a wheeled cart 60.

Base 110 includes a pair of elongated, generally parallel longitudinal brace elements 112 and a plurality of elongated, generally parallel transverse brace elements 114 disposed between longitudinal brace elements 112. As shown in FIG. 3, longitudinal brace elements 112 and transverse brace elements 114 are coupled together via bolts 115 and coupling elements, or plates 116.

In an exemplary embodiment, longitudinal and transverse brace elements 112, 114 may be constructed from UNISTRUT® U-channel, B-LINE® U-channel, metallic box channel, or other suitable structure. A longitudinal axis 117 bisects base 110.

A plurality of trunnion wheels 120 are rotatably coupled to base 110. As shown in FIG. 3, a pair of trunnion wheels 120 are mounted on each of two transverse brace elements 114. Trunnion wheels 120 are disposed about base 110 to receive and rotatably support wheel 50 mounted thereon (shown in FIG. 1). Transverse brace elements 114 that support trunnion wheels 120 are spaced sufficiently close to each other such that outer rims 55 do not engage base 110.

In an exemplary embodiment, each of trunnion wheels 120 is an idler wheel that does not impart any rotational power to wheel 50, but instead, receives rotational power from wheel 50. Trunnion wheels 120 support wheel body 53 of wheel 50 and facilitate rotation of wheel 50 about workpiece axis 52. Alternatively, although not shown, at least one of trunnion wheels 120 may be powered and may rotate wheel 50.

Exemplary trunnion wheels 120 may be constructed from machined neoprene and may be tapered in a generally frustoconical shape such that the larger diameter portion of each trunnion wheel 120 is disposed closer to longitudinal axis 117. Trunnion wheels 120 may be tapered to generally match the taper of wheel body 53 that rolls on trunnions 120. The taper of trunnion wheels 120 prevents wheel 50 from “walking” along painting tool 100 and also self-centers wheel 50 on painting tool 100. Trunnion wheels 120 are located so as to engage wheel body 53 along a portion of wheel body 53 that is not to be painted. In other words, trunnion wheels 120 are disposed so as to engage a portion of wheel 50 that is obscurable by mask 140 during the painting process. This feature allows trunnion wheels 120 to support wheel 50 as wheel 50 is rotated, without marring or smearing any paint that has been applied to wheel 50. It is noted that mask 140 does not rotate with wheel 50, but remains fixed as wheel 50 rotates.

To drive wheel 50, a motor 130 is coupled to base 110. As shown in FIG. 2, motor 130 is mounted on transverse brace elements 114 that support wheels 120. In an exemplary embodiment, motor 130 is aligned generally along longitudinal axis 117. Motor 130 includes a motor output 132 disposed to engage wheel body 53 of wheel 50 and to rotate wheel 50 on wheels 120 about workpiece axis 52. Motor output 132 is not necessarily along longitudinal axis 117. Motor output 132 is located so as to engage wheel body 53 along a portion of wheel body 53 that is not to be painted. In other words, motor output 132 is disposed so as to engage a portion of wheel 50 that is obscurable by mask 140 during the painting process. This feature allows motor output 132 to rotate wheel 50 without marring or smearing any paint that has been applied to wheel 50.

In an exemplary embodiment, motor 130 may be an air driven motor manufactured by Gast Manufacturing, Inc. of Benton Harbor, Mich. An air driven motor or other explosion-proof motor may be used to reduce the risk of igniting any volatile fumes that may be generated while painting wheel 50. Motor 130 may be a variable speed motor to control the rotational speed of wheel 50 on tool 100.

Motor output 132 comprises a drive wheel 134. Drive wheel 134 may be coated with a nylon coating to protect the surface finish of the portion of wheel body 53 that contacts drive wheel 134. In the exemplary embodiment shown in FIG. 3, drive wheel 134 may be located between longitudinal axis 117 and one of longitudinal brace elements 112.

Although not shown, motor 130 may incorporate a reduction gear, including a worm gear, to reduce the output speed of drive wheel 134 relative to the speed of motor 130. The worm gear may also be used to provide proper clearance for motor 130 between base 110 and wheel 50.

Mask 140 is operatively coupled to base 110. As shown in FIG. 3, mask 140 is pivotally coupled to a longitudinal mask support 141, which is in turn coupled to a pair of transverse brace elements 114. These transverse brace elements 114 are, in turn, coupled to longitudinal brace units 112.

Figure 4:
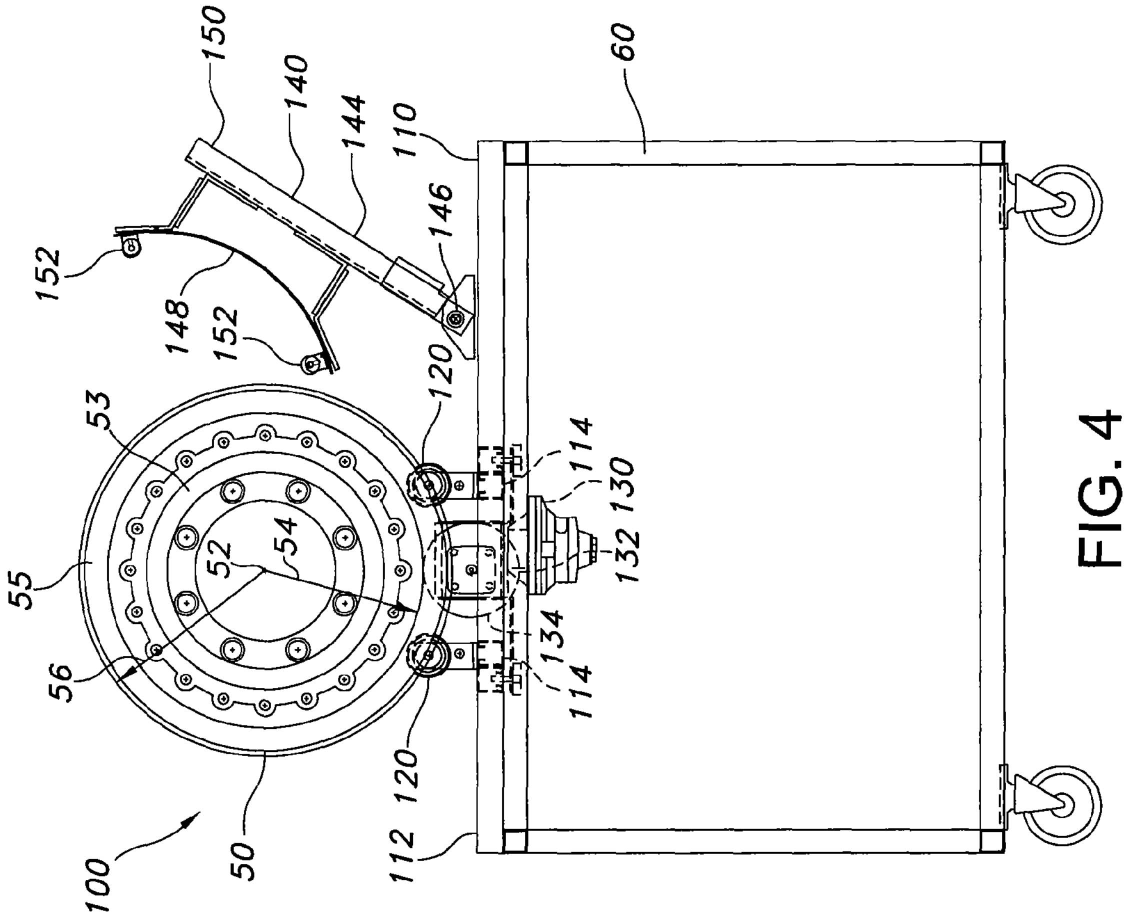
FIG. 4 is a side elevational view of the painting tool of FIG. 1, with the masking arm in a disengaged position.

Mask 140 is movable between an engaged position, shown in FIG. 2, wherein mask 140 obscures a portion of wheel body 53, and a disengaged position, shown in FIG. 4, wherein mask 140 is disposed away from wheel 50. Mask 140 comprises an arm 144 pivotally coupled to base 110 about an arm pivot end 146. Mask 140 further comprises an arcuate masking portion 148 releasably coupled by brackets 143 at a plurality of locations to arm 144. In the exemplary embodiment shown in FIG. 1, four (4) brackets 143 are used. Brackets 143 are adjustably mounted on arm 144.

Arcuate masking portion 148 masks a portion of wheel 50 while wheel 50 is being worked on, such that the wheel body 53 of wheel 50 that is masked does not receive any of the work, such as, for example, paint spray. Arcuate masking portion 148 is curved and adjustable. The radius of arcuate masking portion 148 may be adjusted by moving brackets 143 closer together. The width of arcuate masking portion 148 may be varied to allow paint or powder to be applied along the surface connecting wheel body 53 and wheel outer rim 55. Which is normally a curved surface, to a radius approximately equal to outer rim radius 56 of wheel 50 so that, when mask 140 is in the engaged position, the arcuate length of arcuate masking portion 148 is aligned with outer rim radius 56 of wheel 50. The width of arcuate masking portion 148 may be varied by removing arcuate masking portion 148 and replacing it with another arcuate masking portion having a different width. In an exemplary embodiment, arcuate masking portion 148 may be constructed from a material such as polypropylene, due to the ability to conform polypropylene to a desired arc to match any radius from outer rim radius 56 to inner wheel body 53. Thus allowing the paint to be applied along a symmetrical and typically curved surface.

The arcuate length of arcuate masking portion 148 may trace an arc of between about 45 and about 135 degrees. In an exemplary embodiment, arcuate length of arcuate masking portion 148 traces an arc of about 90 degrees. The width of arcuate masking portion 148 is sized such that arcuate masking portion 148 is disposed between each of outer rims 55 with minimal clearance between arcuate masking portion 148 and outer rims 55.

Arcuate masking portion 148 comprises at least one mask wheel 152 adapted to rotatably engage wheel radius 54 of wheel 50 when mask 140 is in the engaged position. In an exemplary embodiment, mask wheel 152 comprises an idler wheel. In an exemplary embodiment, arcuate masking portion 148 is formed from a generally rectangular material, with a mask wheel 152 disposed at each corner of masking portion 148. Mask wheel 152 spaces mask 140 a predetermined distance away from wheel 50.

As best illustrated in FIG. 3, in an exemplary embodiment, base 110 is a modular system, with longitudinal brace elements 112 releasably coupled to adjacent transverse brace elements 114 by means of bolts 115 and coupling plates 116. With base 110 being modular, base 110 may be disassembled and reconfigured to fit wheels 50 having different widths and/or radii. To accommodate wheels 50 of different radii, the longitudinal spacing between transverse brace elements 114 may be adjusted accordingly. To accommodate wheels 50 of different widths, the spacing between trunnion wheels 120 on common transverse brace elements 114 and the width of arcuate masking portion 148 may be adjusted accordingly.

While an exemplary system and method for assembling base 110 in a modular fashion is described above, those skilled in the art will recognize that brace 110 may be constructed as a permanent unit, with longitudinal brace elements 112 and transverse brace elements 114 coupled to each other by any other suitable means, including, but not limited to, welding (not shown).

In operation, painting tool 100 is initially set up with mask 140 in the disengaged position, as illustrated in FIG. 4. Wheel 50 is placed on top of wheels 120. In addition to wheels 120 engaging and supporting wheel body 53, drive wheel 134 also engages wheel body 53.

Mask arm 144 is next pivoted about arm pivot end 146 to the engaged position, as illustrated in FIGS. 1 and 2. In the engaged position, mask wheels 152 engage wheel body 53 such that arcuate masking portion 148 is generally aligned with an equidistant point between outside wheel rim 55 and inside wheel body 53 such that when the coating is applied, the coating may be symmetrically applied along the desired bead contact line where the tire (not shown) and wheel rim 55 engage. Drive wheel 134 is rotated by motor 130 such that wheel 50 is rotated on trunnion wheels 120. Wheel 50 is painted by a painting device, such as a paint spray gun or powder gun (not shown) such that rims 55 are painted, but wheel body 53, which is desired to not be painted, is obscured by mask 140 such that overspray that might inadvertently paint body 53 will paint mask 140 instead.

After several revolutions of wheel 50, during which rims 55 and the interior of wheel 50 are painted, motor 130 is stopped and mask 140 is pivoted away from wheel 50. Painted wheel 50 is then removed from tool 100 and the painting process is repeated with a new wheel.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of applying a coating to a portion of a wheel, said method comprising the steps of:

a) mounting the wheel on a coating tool;

b) moving a mask from a disengaged position away from the wheel to an engaged position engaging the wheel and towards the wheel such that the mask obscures a further portion of the wheel in the engaged position;

c) rotating the wheel on the coating tool by applying power to a motor having an output which engages the wheel at the further portion of the wheel which is obscured by the mask; and d) applying coating to the wheel with the mask in the engaged position such that the coating is prevented from being applied to the further portion of the wheel which has been obscured by the mask.

2. The method according to claim 1, wherein step a) further comprises engaging the wheel with a plurality of idler wheels at a location on the wheel not to be painted, wherein the idler wheels rotatably support the wheel.

3. The method according to claim 1, wherein step c) further comprises rotating the wheel with an explosion-proof motor and capstan drive wheel.

4. The method according to claim 1, wherein step b) further comprises the step of spacing the mask a predetermined distance away from the wheel.

5. The method according to claim 1, wherein the mask includes at least one mask wheel adapted to rotatably engage the wheel when the mask is in the engaged position.

6. The method according to claim 1, wherein step a) includes the step of mounting the wheel on at least one tapered trunnion wheel which is included in the coating tool and which supports the wheel, wherein the tapered wheel is tapered with decreasing diameter.

7. The method of claim 1, wherein the coating is electrostatically or non electrostatically applied liquid paint or powder paint.

8. The method according to claim 1, wherein step b) includes the step of pivoting the mask from the disengaged position to the engaged position by pivoting an arm which supports the mask.

9. The method of claim 6, wherein at least one of the trunnion wheels is frusto-conical.

10. The method of claim 8, wherein the mask includes an arcuate masking portion coupled to a free end of the arm.

11. The method of claim 1, wherein step a) includes the step of mounting the wheel on a plurality of tapered trunnion wheels which are included in the coating tool and which supports the wheel, wherein the tapered trunnion wheels are diametrically opposed and are tapered with decreasing diameter.

12. The method of claim 11, wherein each of the plurality of trunnion wheels are frusto-conical.

13. The method of claim 6, wherein the trunnion wheel engages the wheel at a portion of the wheel obscured by the mask.

14. The method of claim 11, wherein the plurality of trunnion wheels engage the wheel at a portion of the wheel obscured by the mask.

* * * * *